United States Patent [19]

Buckley

[11] Patent Number: 5,217,654
[45] Date of Patent: Jun. 8, 1993

[54] TWO-STAGE MAT FORMING PREFORMING AND MOLDING PROCESS

[75] Inventor: Daniel T. Buckley, Shrewsbury, Vt.

[73] Assignee: The C.A. Lawton Company, DePere, Wis.

[21] Appl. No.: 828,310

[22] Filed: Jan. 30, 1992

[51] Int. Cl.⁵ ............... B29C 43/02; B29C 45/00; B32B 31/12; C08F 2/46

[52] U.S. Cl. ............... 264/22; 156/166; 264/134; 264/135; 264/136; 264/257; 264/266; 264/279; 264/294; 264/324; 264/325; 264/328.1; 522/4; 522/6

[58] Field of Search ............ 264/257, 258, 22, 25, 264/27, 103, 134, 138, 145, 160, 309, 135, 136, 259, 266, 279, 294, 324, 325, 328.1; 522/4, 6, 100–103, 170; 156/166

[56] References Cited

U.S. PATENT DOCUMENTS

| | | | |
|---|---|---|---|
| 3,097,125 | 7/1963 | Green | 156/245 X |
| 3,684,645 | 8/1972 | Temple et al. | 156/166 X |
| 3,770,602 | 11/1973 | D'Alelio | 522/100 |
| 3,878,019 | 4/1975 | Chapman et al. | 264/22 X |
| 3,997,417 | 12/1976 | Marek et al. | 522/4 |
| 4,012,553 | 3/1977 | Clemens . | |
| 4,054,713 | 10/1977 | Sakaguchi et al. . | |
| 4,070,497 | 1/1978 | Wismer et al. | 522/4 X |
| 4,101,254 | 7/1978 | Wiltshire | 264/112 X |
| 4,165,265 | 8/1979 | Nakabayashi et al. | 522/4 |
| 4,252,592 | 2/1981 | Green | 156/275.5 X |
| 4,291,087 | 9/1981 | Warburton, Jr. | 522/4 X |
| 4,478,771 | 10/1984 | Schreiber | 264/22 |
| 4,663,225 | 5/1987 | Farley et al. . | |
| 4,869,855 | 9/1989 | Twilley et al. | 264/25 |
| 4,892,764 | 1/1990 | Drain et al. | 264/DIG. 59 X |
| 4,898,770 | 2/1990 | Dunbar | 156/166 X |
| 4,942,086 | 7/1990 | Madge et al. | 428/291 X |
| 5,041,260 | 8/1991 | Johnson et al. | 264/112 X |
| 5,102,924 | 4/1992 | Williams et al. | 522/4 |

FOREIGN PATENT DOCUMENTS

| | | | |
|---|---|---|---|
| 8210 | 12/1982 | Japan | 264/25 |
| 138235 | 8/1984 | Japan | 264/25 |
| 5819 | 1/1987 | Japan | 264/25 |
| 2015915 | 9/1979 | United Kingdom . | |

*Primary Examiner*—Karen Aftergut
*Attorney, Agent, or Firm*—Hill, Steadman & Simpson

[57] ABSTRACT

Glass fiber mats are made for subsequent use in preforming for an RTM or SRIM molding process, for example, such that the binder applied to the mat has two distinct curing stages. In the first stage, a partial cure is provided by visible light upon a free radical generation in response to a photoinitiator mixed in the binder in an exact ratio to give a predictable increase in viscosity to that of a semi-solid so that the fibers are sufficiently bound for subsequent handling, but not sufficient to complete a cure, while leaving a second stage ready for a final cure which is achieved by the use of a cationic-type second photoinitiator which is sensitive to ultraviolet light. During the second curing stage, the mat is formed into a three-dimensional shape of a desired end product and cured with ultraviolet radiation while still in the mold, to obtain a rigid three-dimensional preform structure.

9 Claims, 2 Drawing Sheets

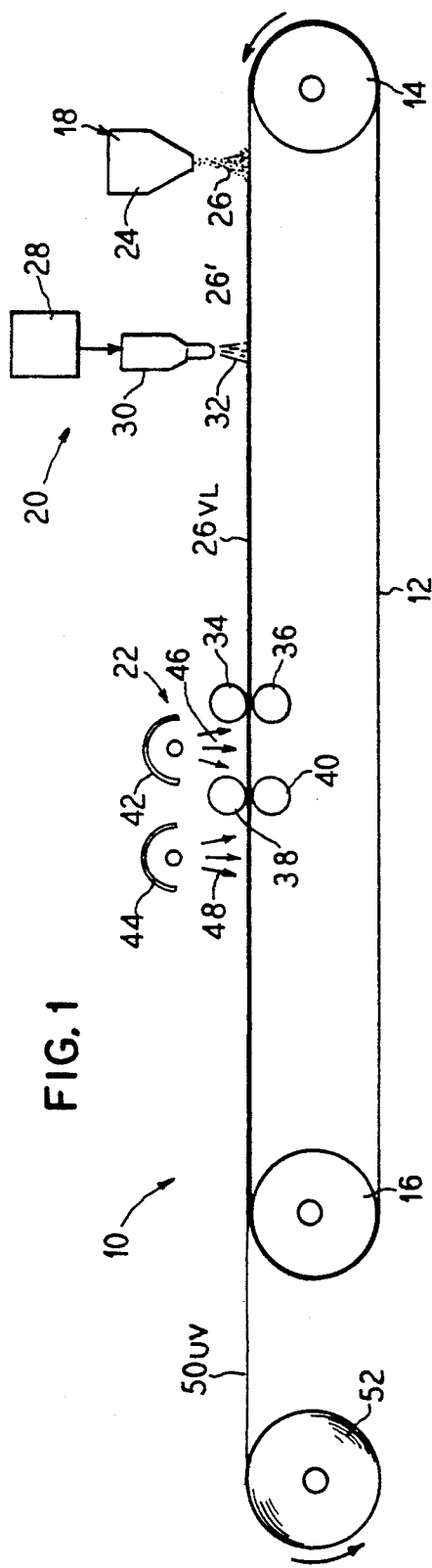
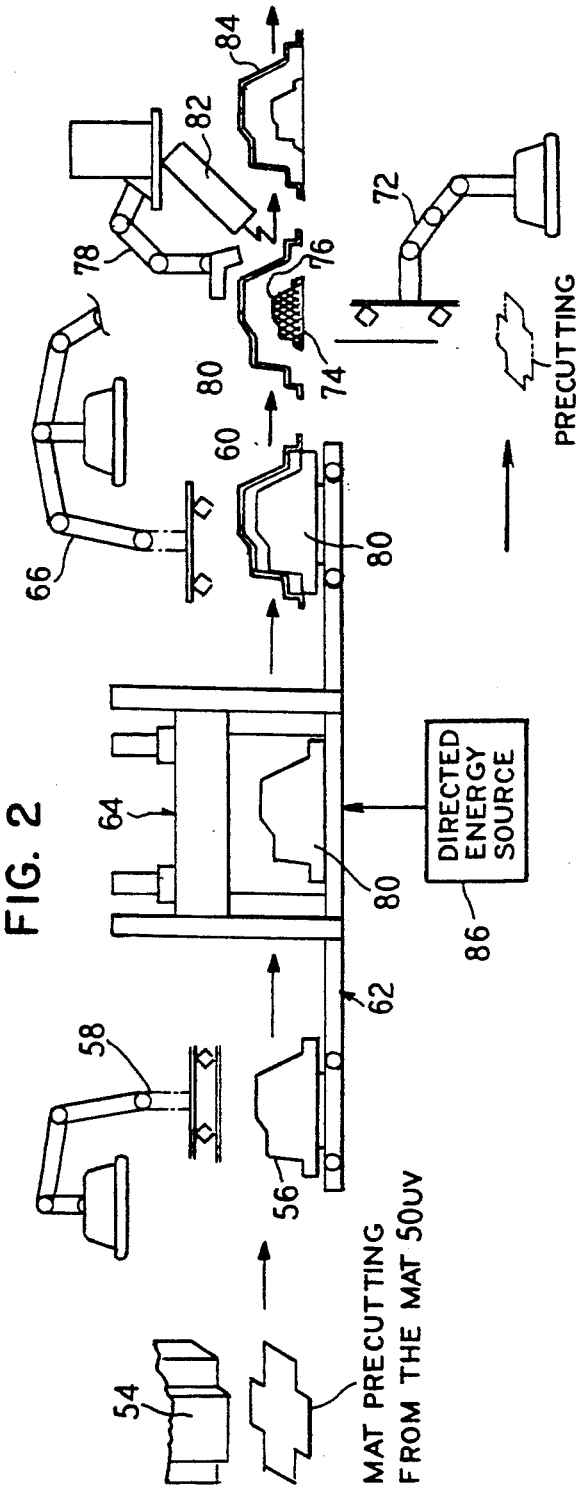

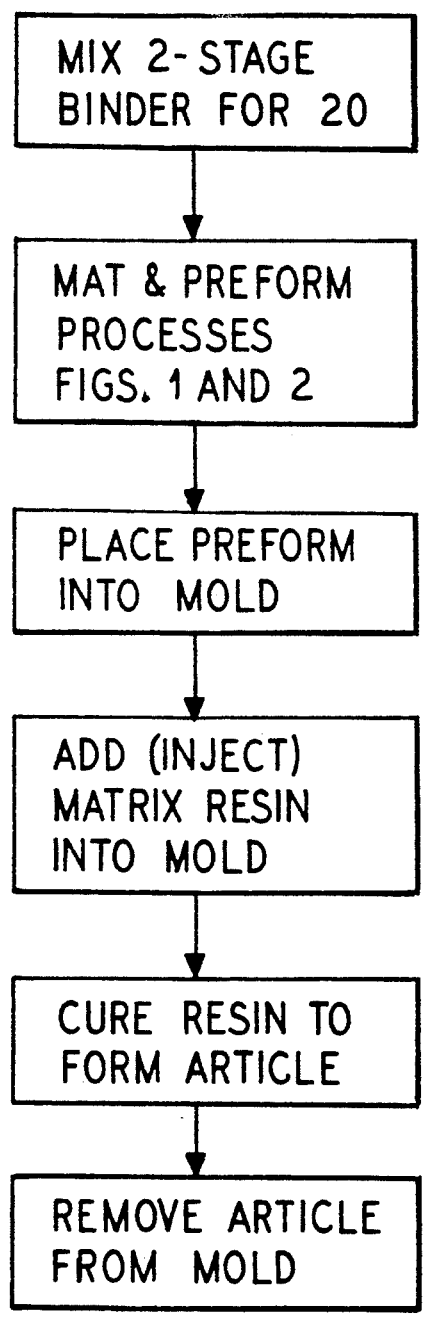

TWO-STAGE MAT FORMING PREFORMING AND MOLDING PROCESS

BACKGROUND OF THE INVENTION

1. Field of the Invention:

The present invention relates to two-stage binders, a mat making and preforming process, and to apparatus for carrying out the process, for curing binders on nonwoven reinforcing materials, woven reinforcing materials and combinations thereof during their manufacture, and is more particularly concerned with utilizing directed energy which is focused for reaction on a two-stage binder without involving the reinforcing materials to a significant degree.

2. Description of the Prior Art

Heretofore, it has been common in the art of manufacturing glass fiber mats, woven materials and other reinforcing materials to apply a binder to both assist in holding the reinforcing material together and promoting a better bond between a matrix resin and the reinforcing material during a subsequent RIM, RTM or SRIM molding process. These binders are usually dry, powder resins, but can be emulsions or liquids. The fiber materials are produced in a conventional manner for the type of construction desired. Normally, the binders are applied to the reinforcements and then subjected to heating, to melt, or dry- before-melt, and sometimes to cure the binders. This process uses significant quantities of energy as the entire mass of reinforcing material needs to be heated to the required melting and/or drying and/or reaction temperatures. The binder can be either unsaturated, cured or staged, depending on application requirements. In this connection, one may refer to U.S. Pat. No. 4,054,713 of Sakaguchi, et al, fully incorporated herein by this reference, particularly to column 4, beginning at line 27.

Also of interest is U.S. Pat. No. 4,012,553, issued Mar. 15, 1977, in which a partial cure by ultraviolet radiation is disclosed.

In conventional systems, many disadvantages are evident such as the large amount of energy required for involving the entire mass of reinforcing material, the size of the ovens required, the time required for heating and cooling and the production of volatiles that must be collected to prevent contamination of the environment.

It was therefore an object of the invention disclosed in my application for U.S. letters patent Ser. No. 685,896, filed Apr. 16, 1991, to provide an improved mat forming process which is fast, efficient in its energy requirements, and safe from an environmental standpoint.

That object was achieved by providing a process and an apparatus for carrying out the process in which a layer of reinforcing fibers is formed on a traveling web, such as a conveyor belt, binder is applied to thinly coat the layer without filling the interstices between the fibers, for example by spraying or calendaring, the binder-coated layer is compressed to a desired density/thickness ratio, and the binder is cured during compression. The resulting mat is then taken from the web and rolled up.

The binder in that application was selected as an electromagnetically-curable binder, either an ultraviolet energy-curable binder or a microwave energy-curable binder. Accordingly, during curing, the corresponding ultraviolet or microwave energy is applied while the layer is compressed to the desired density/thickness ratio. Here, ultraviolet is considered to be from deep uV ($\approx 200$ nm) up to visible light ($\approx 450$ nm). Combinations of wavelengths may be used to advantage in practicing the invention.

As is readily apparent, the process and apparatus of the above-identified invention differs significantly from that heretofore known in the art in that directed energy is used to cure the special binders developed for the process, the binders being sensitive to the directed energy used, preferably microwave or ultraviolet. The binders can be cured on the fiber with directed energy without involving the mass of fibers in the energy of reaction. The binders are typically oligomers, unsaturated polyesters, epoxides, polyacrylics, polyurethanes, and the like. When cured, the binders have unsaturated sites available for subsequent bonding with matrix resins in subsequent molding processes such as RTM and SRIM processes. Using this process, the reinforcing material is primarily passive to the activation energy. The reaction takes place without involving the reinforcing materials since the activation energy is targeted only at the binder. The binders perform the same functions as in the conventional manufacturing systems, but can be cured much more rapidly, with significantly less energy and without producing significant volatiles that have to be collected to prevent contamination of the environment. Because there are basically no volatiles, there is little or no need to collect the volatiles driven off by heat, there is little or no need for make-up air and little or no need for make-up heat, thereby saving energy and thereby substantially avoiding contamination of the environment.

As mentioned, the directed-energy source can be either ultraviolet light energy or microwave energy as in my co-pending applications, Ser. No. 446,859 filed Dec. 6, 1989, Ser. No. 552,253 filed Jul. 12, 1990, and Ser. No. 609,420, filed Nov. 5, 1990, all relating to the production of three-dimensional preforms using ultraviolet or microwave energy-curable binders and corresponding ultraviolet or microwave energy sources for curing. Contrary to the aforementioned applications, which disclose stepped forming processes, the process of forming a mat in Ser. No. 685,896, filed Apr. 16, 1991, is continuous.

SUMMARY OF THE INVENTION

The object and intention of this invention to provide new binders for use with reinforcements such as glass fibers, along with a method for making mats of such fibers and a method and apparatus for making preforms from such mats.

According to the invention, the new binders are to be used to make mat-type products that will subsequently be used in the manufacture of preforms which, by definition, are three-dimensional reinforcement shapes without matrix resins impregnated therein and are used in a molding process such as the RIM, RTM and SRIM molding processes. The binders can be used in varying ratios with respect to the weight of the glass fiber material. Typical ratios will be on the order of 1% by weight to 12% by weight of the glass fiber material and it is preferred that the binder ratio will be in the range of 2% to 8% range. The binders are unique in that they will contain two separate photoinitiators that will function independently in initiating the reaction of the binder and such binders considered as two-stage binders.

The first stage includes a photoinitiator which is a free radical generator of the type provided by a number of materials such as Irgacure 651, Irgacure 184 or Irgacure 907. The amount and selection of this photoinitiator in combination with the type of binder resins will determine the first stage of viscosity after exposure to visible light.

It is therefore readily apparent that the first stage which is responsive to provide a partial cure is responsive only to visible light and the remainder of the binder is uncured until such time that the same is used in making a preform and is only responsive to other electromagnetic energy, such as ultraviolet light or microwave energy. In the alternative, the first stage may be fashioned to be microwave driven, particularly if the mat manufacturer uses a binder containing moisture. Suitable materials as photoinitiators are Lupersol 256, Benzyl Peroxide, Tertiary Butyl Peroctoate and Tertiary Butyl Perbenzoate.

The first-stage constituent is employed in a predetermined ratio to the binder such that when exposed to visible light, a reaction will start using the free radicals being generated and cross linking will proceed until the free radicals are all linked or used up and the reaction will then stop.

The ratio of first-stage photoinitiator to the binder resin and exposure to microwave drive or visible light, which ever is appropriate, will determine the viscosity of the resulting partially-polymerized binder. The viscosity should be such that, when staged in this manner, the binder will have the viscosity raised to a point where it will hold the glass fibers together for handling, preferably tack-free, during subsequent processing. The binder will be plastic, deformable and not yet rigid enough to hold the three-dimensional shapes of preforms. In other words, it will be pliable for further handling and the interstices of the glass fibers are obviously not filled at this time as they will be later during the final molding process.

The second stage constituent includes a photoinitiator that is a cationic type photoinitiator responsive to ultraviolet light that will continue to provide electrons for cross linking as long as the second constituent is exposed to ultraviolet light in a predetermined portion of the ultraviolet spectrum. Typical photoinitiators for this portion of the reaction are Irgacure 261, Cyracure UVE 6990 and Cyracure UVE 6974. The Irgacure products are produced by Ciga Geigy Corp. of Greensborough, N.C. and Hawthorne N.Y. and the Cyracure products are produced by American Cyanamid Corporation, Wayne, N.J.

Because the second-stage photoinitiator has been left unreacted by the visible light during the first-stage processing, the second stage is now available to complete the cure and make the binder rigid which is advantageous from the point of having the mat pliable for use in molding equipment to make a preform. The second stage cure takes place after the mat product has been formed into its three-dimensional shape which is the shape determined as necessary to replicate the final product for the final molding operation. The second stage cure takes place by exposing the binder to ultraviolet light, for example, such as in the CompForm ™ processes disclosed in the aforementioned applications Ser. No. 446,859, filed Dec. 6, 1989 and 552,253, filed Jul. 12, 1990. CompForm ™ is a trademark of the C. A. Lawton Company, assignee of the present invention.

As indicated above, there are many advantages to using this two-stage type of binder. Heat can be utilized to either drive off the solvent (moisture) or carry it off during mat forming. Heat is also eliminated as the mechanism to advance the binder or cure the binder during the mat-making process. By using a two-stage binder constructed in accordance with the present invention, high-speed production can be achieved with a very low energy cost.

The present process will permit the use of single end roving, such as PPG No. 2002, OCF 366, 107B or 30, or Certainteed 625 or 670. This will provide a variety of yields with the yield selected in accordance with the binder resin makeup.

The two-stage binder also eliminates the need for two separate applications of different binders when preforming using ultraviolet-cured binders for preforms as in the aforementioned Compform ™ processes. Current technology dictates that mat-type products are purchased with conventional binders applied thereto when they are produced. Conventional binders require modification with heat during preforming or their resilience must be overcome during preforming. New two-stage binders, according to the present invention, eliminate these problems by using a single binder resin with two photoinitiators. The first stage takes the place of the first binder as applied by the reinforcement manufacturer, i.e. the glass fiber manufacturer, and the second stage takes the place of the second binder applied by the preform manufacturer for use in preforming.

Because the first stage photoinitiator partially reacts the binder, the second stage cure requires less cross linking to obtain a final cure. This will speed up the second stage cure over what it would have been if there was no first stage cure.

It should be understood that the free radicals generated in the first stage curing cross link with each other until there are no further free radicals. In the second stage curing, the free electrons are shared by the orbital rings for cross linking.

Since the binders are liquid, they do not need to be carried in water to be sprayed. Residual moisture in the reinforcing fibers has long been proven as a cause for reduction of physical and electrical properties with some matrix resins. Because there is no water in the system, there is no required drying and the just-mentioned problem is overcome. Curing by directed energy provides the necessary stiffness and material handling characteristics.

For simplicity, the following description is primarily concerned with nonwoven mats, since any process benefits are also applicable to any woven reinforcements where binders are used.

Fiber mats come in two general categories, discontinuous fibers called chopped strand mat and continuous fibers generally called continuous strand mat. There are many styles to each of these types of mats.

In the process of the present invention, the fiber mats are prepared by the manufacturer, i.e. as a layer of fibers deposited on a moving web, as disclosed in the aforementioned U.S. Pat. No. 4,054,713 and in accordance with the present invention using a two-stage binder. The mats are prepared on a continuous web or belt and, upon completion of the layer formation, a binder is applied, typically by spraying, or it can be calendared. This is not a filling or impregnating step. The binder is applied in a range of 1%–12% by weight of the glass fiber, typically and preferably in the range of 2.0–8.0 weight percent. After application of the two-stage binder, a residence time to allow some wetting of the fibers can be provided by a transport distance to the compression and curing section of the production line as in my aforementioned application, Ser. No. 685,896, filed Apr. 16, 1991.

The intent of the present concept is to provide new binders for use with reinforcement material such as glass fiber. These new binders are to be used to make mat-type products that will then be used in the manufacture of preforms which as is well known in the art, are then used in the manufacture of impregnated finished articles such as bumper beams, sinks and the like. It is to be understood that preforms are three-dimensional products which are used as a basis for making, and as a backbone for making a conforming three-dimensional finished RIM, RTM, SRIM, or similar molded product.

It is usually desirable to compress the layers to achieve the proper density/thickness ratio as mentioned above. In the process of the present invention, as in the aforementioned application Ser. No. 685,896 the layers are compressed in stages and held in compression during staged curing, here with visible light. There are several techniques available for achieving the desired density/thickness ratio by compression using rollers or continuous belts or combinations thereof as disclosed in the aforementioned applications.

When using visible light as the first curing energy, light can be applied in several different ways: through a web or continuous belt; between rollers over the belt or web, through the rollers; and through the openings between rollers. When the light source is to be contained in the rollers and the light transmitted through the rollers, the rollers can be made of porous metal screen that will allow light transmission or that they can be made of a light-transparent material, such as a light-transparent acrylic or of a light-transparent glass or quartz. The belt or web can be made of a porous flexible metal screen that will permit light transmission or it can be made of a light transparent polymer belt or web, such as light-transparent polyethylene, light-transparent acrylic or light-transparent polyvinylchloride. Transparency is relative to the portion of the spectrum in which one is operating. As in the aforementioned application Ser. No. 685,896, a light-transparent film can be employed as the web which would also act to keep the uncured binders from the surfaces of the rollers or belts, if desired. It would also keep the potentially-abrasive glass materials from wearing out the surfaces of the transport system. If desired, the light-transparent film can be left with the product as a layer separator in the rolls. A further use of this film then can be as a vacuum seal if desired in subsequent cutting or forming applications, such as in my aforementioned preform applications.

The film can also be used as a release film during preforming processes of the type referenced above, when applicable or desired.

The primary difference between these two processes is that the present invention, a two-stage binder is employed in which the first stage constituent is responsive to visible light to generate cross linking radicals and provide a viscosity sufficient to hold the glass fibers together for subsequent handling and the second stage constituent is responsive to ultraviolet light and produces free electrons to be shared (cross-linked) between binder elements.

Compression of the materials can be achieved by feeding the mats between two continuous belts or webs that maintain pressure while moving through the light sources. Rollers can be placed between or within the light sources transversely of the web to maintain pressure on the belts or webs. The pressure can also be maintained by having the belts or webs held together (pneumatically, hydraulically, springs, etc) and by having a continuous surface on each half of the waveguide in contact with the belt or web. This continuous surface will be made of a low-friction, low-loss material (in the case of microwave) such as high molecular weight polyethylene or ultra-high molecular weight polyethylene. The belt or web will be similar in material.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic representation illustrating a transport system and all of the elements for carrying out the method of the invention including the forming of a layer of fibers on a traveling belt, the application of a thin coating or thin film of a two-stage binder to the layer, and the contemporaneous compressing of the layer and curing of the first stage of the binder, with the subsequent taking off and rolling up of the finished mat;

FIG. 2 appears on the same sheet with FIG. 1 and is a schematic representation showing the CompForm TM process disclosed in the aforementioned application Ser. No. 446,859, filed Dec. 6, 1989; and FIG. 3 is a process flow chart setting forth the entire process completely through the making of the final molded article.

DESCRIPTION OF THE PREFERRED EMBODIMENTS

The invention is applicable to the utilization of different forms of directed energy. Therefore, a detailed description of the use of visible and ultraviolet light responsive systems will be provided hereinbelow.

Visible Light Activation

Referring to FIG. 1, a mat forming system is generally illustrated at 10 as comprising a plurality of stages spaced along a conveyor belt 12 which is supported for travel along a defined path by a pair of end rollers 14 and 16. The system includes a fiber preparation and application stage 18, a binder applicator 20 and a compression and curing stage 22. At the terminus of the conveyor belt 12, adjacent the roller 16, the formed mat is taken off and rolled up on a take-up or winding roller 52.

At the applicator stage 18, reinforcement fibers, for example either continuous strand or chopped glass fibers, are prepared in a manner known in the art, such as disclosed in the aforementioned U.S. Pat. No. 4,054,713, in the apparatus 24 and deposited, symbolically indicted by the arrow 26, onto the upper surface of the conveyor belt 12 as a layer 26' of fibers. The layer 26' of fibers is then received at the binder applicator station 20 in which binder is drawn from a supply 28, here a two-stage visible and ultraviolet light energy-curable binder, and applied by way of a sprayer 30 as a spray 32 onto the upper surface of the formed layer 26' to form a binder-coated layer $26_{VL}$ on the upper surface of the conveyor belt 12 with a 1.0–12.0 weight percent of binder, preferably 2.0–8.0 percent weight with respect to the glass fiber or other reinforcement material. It will therefore be appreciated that the binder is applied, not as a fill, but more as a thin penetrating random disposition of droplets.

The binder-coated layer $26_{VL}$ then passes into the compression and curing stage 22 in which the conveyor belt 12, more particularly the layer $26_{VL}$ carried thereon is compressed between pairs of spaced compression rollers 34, 36, 38 and 40 where the layer $26_{VL}$ is compressed to a desired density/thickness ratio by the rollers, in stages, and the binder is cured, in stages, by way of the spaced visible light sources 42, 44 (or split microwave waveguides) which extend transversely of the layer $26_{VL}$ and radiate the same as indicated at 46, 48.

After compression and curing, the finished fiber mat, now referenced $50_{UV}$ is taken from the conveyor belt 12 and rolled up on the wind-up roller 52. The same is drawn from the roll and fed to the die cutter 54 of FIG. 2.

As disclosed in my aforementioned application Ser. No. 446,859 and as illustrated in FIG. 2, the first step may be to precut a reinforcement material from the mat $50_{UV}$ to conform to the developed shape of a preform, as indicated by the die cutter 54. This is undertaken after the initial portion of the process set forth in FIG. 1. After the mat is cut at 54, the composite blank of reinforcement material and binder is transported to a mold 56 by a robot 58. The mold may be of the type illustrated in FIG. 2 such that the composite blank is positioned on the male portion of the mold 56 as indicated at 60 of FIG. 2. The mold portion 56 is then moved along a shuttle 62 to a press 64 where the two halves of the mold are pressed together to replicate the desired shape of the preform and energy is applied from a directed energy source 86 such as a source of microwave or ultraviolet light energy.

Next, the mold is unloaded by moving the same along the shuttle 62 to a position where a robot 66 unloads the cured preform 68. Here, the preform becomes a "carrier" preform in that reinforcement is to be added in the form of a reinforcing structure. The robot 66 will then stack the carrier preform for short term storage or move it directly into an energetic stitching process.

When elements are to be stitched (connected) to the carrier preform, the reinforcement material is precut, as before, and a robot 72 positions the precut material over a former 74 so that it takes a reinforcement shape 76. A robot 78 then retrieves the carrier preform 68, and places the same over the formed element 76. There will be points, not shown, that the carrier preform 68 and the formed element 76 engage in intimate contact. In the energetic stitching process, the element 76 comprises a binder resin. When the energetic stitching process relies on ultraviolet energy, an ultraviolet sensitive binder resin is applied at specific spot locations where the elements 68 and 76 are in intimate engagement. Ultraviolet energy is then applied to cure and bond. For this purpose, a directed energy source 82 is then employed to cure the binder and bond the two elements together to form a reinforced structure 84. The structure 84 is then transferred to an RIM, RTM or SRIM molding process for molding of the finished structure.

As may be appreciated from the foregoing, attachments may be bonded to a carrier preform to increase structural strength of the molded end product or to add attachment devices for the molded end product by the energetic stitching of elements to the preform. It is not necessary that one element to be attached to another be made by the same energy directed process, or at all by a particular energy directed process. One element may be attached to another by the application of a microwave-sensitive or ultraviolet-sensitive binder resin and the application of the corresponding energy to cure that binder resin. Therefore, this flexibility is an advantage of the energetic stitching process in that a preform made by the microwave technique may have a reinforcement element attached by energetic stitching using the ultraviolet technique and vice-versa. Also, elements such as wood, steel, carbon black and the like may be attached to a preform by using either technique in combination with the appropriate binder resin.

Mention has been made above of the use of ultraviolet energy in making a preform. This technique is generally similar to the microwave technique in that ultraviolet light sources are placed in the tooling to direct ultraviolet radiation toward fiber reinforcement preforms to form rigidized structures. Glass fiber reinforcement material including optically-clear fibers, containing a rigidizing binder resin is placed between two matching half sections of a tool. When radiation is applied, the binder resin undergoes molecular polymerization forming a rigid product that allows the glass fiber material to be held to conform to the shape of the tool.

Referring to FIG. 3, the entire molding process is generally set forth in flow-chart style in which a two-stage binder is mixed for the binder applicator 20 of FIG. 1, the mat is formed according to FIG. 1 and a preform is formed according to FIG. 2. The preform is then placed into a mold, in accordance with RIM, RTM and SRIM processes and a deformable plastic material, such as a matrix resin is introduced into the mold, such as by injection, to flow the matrix resin into and fill the interstices of the preform. The mold may be a press mold and conforms to the article to be replicated. The matrix resin is then cured in the mold and the product is then removed according to standard molding processes.

I have found that, in general, certain binder resins may be employed in the general ultraviolet technique of my aforementioned applications. These are available from Freeman Chemical and are known as 80497 (slow system), 747-10 (medium system) and 19-4837 (fast system). However, the earlier-mentioned compositions of the two-stage binder are better suited to the two-stage binder process.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method of making a preform comprising the steps of:
   (a) mixing a two-stage binder including a first binder constituent which has a photoinitiator responsive to visible light to generate free radicals which cross link and provide a viscosity sufficient to hold glass fibers together and a second binder constituent which has a cationic-type second photoinitiator responsive to ultraviolet light to generate electrons for cross linking and rendering the binder rigid;

(b) applying the two-stage binder to a mat of glass fiber reinforcement material to coat glass fibers of the mat without filling interstices among the glass fibers;

(c) exposing the two-stage binder to visible light to partially polymerize the binder such that it has a viscosity sufficient to hold the glass fibers together for subsequent handling;

(d) placing the partially polymerized binder-coated mat into a preform mold which is transparent to ultraviolet radiation;

(e) pressing the mat into a desired shape; and (f) exposing the pressed mat to ultraviolet radiation through the mold to activate the second photoinitiator and produce a rigid three-dimensional preform.

2. The method of claim 1, wherein the step (a) of mixing a two-stage binder and the step (f) of exposing the binder-coated mat to ultraviolet radiation are further defined as:

(a1) mixing the two-stage binder to include the second constituent which is responsive for curing in response to a predetermined wavelength; and (f1) exposing the pressed mat to ultraviolet light of the predetermined wavelength.

3. The method of claim 1, wherein the step (b) is further defined as:

(b1) applying the two-stage binder in a range of 2% to 8% by weight of the glass fiber reinforcing material.

4. The method of claim 1, wherein the step (c) of exposing the two-stage binder to visible light is further defined as:

(c1) exposing the two-stage binder to visible light until the generated free radicals are all cross linked.

5. The method of claim 1, wherein the step (f) is further defined as:

(f1) exposing the pressed mat to ultraviolet light for a predetermined time so that it continues to provide electrons for cross linking for that predetermined time.

6. A method of making a three-dimensional preform, comprising the steps:

(a) applying a coating of a two-stage binder to a mat of glass fibers to coat the fibers without filling interstices among the fibers, with a binder comprising a first constituent including a first photoinitiator which is responsive to visible light to produce free cross-linking radicals to provide a partial cure for the binder in which the binder has a viscosity sufficient to hold the glass fibers together, and be plastic and deformable, and a second constituent including a cationic-type second photoinitiator which is responsive to ultraviolet radiation to cure by producing cross-linking electrons so that the binder becomes rigid;

(b) exposing the binder-coated mat to visible light to activate the first photoinitiator of the first constituent;

(c) placing the binder-coated mat in an ultraviolet-transparent mold having a desired size and shape of the three-dimensional preform to be made;

(d) pressing the mat in the mold into the desired size and shape of the preform to be formed;

(e) exposing the pressed mat to ultraviolet radiation through the mold to activate the second photoinitiator of the second constituent to form a rigid preform; and (f) removing the rigid preform from the mold.

7. The method of claim 6, wherein the step (a) of applying a coating to the binder is further defined as:

(a1) applying a film of the binder to the glass fibers in a range 1% to 12% by weight of the glass fibers in the mat.

8. The method of claim 7, wherein the step (a1) of applying a coating is further defined as:

(a1a) applying a film of the binder to the glass fibers in the range of 2% to 8% by weight of the glass fibers in the mat.

9. The method of claim 6, and further comprising the steps of:

(g) placing the rigid preform in a second mold which replicates a part to be formed;

(h) inserting deformable plastic material into the second mold along with the preform;

(i) pressing the preform and the deformable plastic material in the second mold to flow the plastic material such that it fills the interstices of the glass fibers of the preform;

(j) curing the plastic material to rigidize the pressed preform having the deformable plastic material therein to form a desired part; and (k) removing the formed desired part from the second mold.

* * * * *

UNITED STATES PATENT AND TRADEMARK OFFICE
CERTIFICATE OF CORRECTION

PATENT NO. : 5,217,654
DATED : June 8, 1993
INVENTOR(S) : Daniel T. Buckley

It is certified that error appears in the above-indentified patent and that said Letters Patent is hereby corrected as shown below:

Col. 3, lines 2-4, cancel "of the type provided by a a number of materials such as Irgacure 651, Irgacure 184 or Irgacure 907"

Col. 3, line 17, cancel "photoinitiators" and insert --initiators-- therefor

Col. 4, lines 2-4, cancel "Heat can be utilized to either drive off the solvent (moisture) or carry it off during mat forming."

Col. 4, line 4, after "is", cancel "also"

Signed and Sealed this

Twenty-third Day of May, 1995

Attest:

BRUCE LEHMAN

Attesting Officer      Commissioner of Patents and Trademarks